Feb. 2, 1937. J. S. ABERCROMBIE ET AL 2,069,297

VALVE

Filed Jan. 23, 1932

James S. Abercrombie
Joseph A. Tennant
Herbert Allen
Inventors

By J. Vincent Martin
Attorney

UNITED STATES PATENT OFFICE 2,069,297

VALVE

James S. Abercrombie, Joseph A. Tennant, and Herbert Allen, Houston, Tex., assignors, by direct and mesne assignments, to Stephens Pump Company, Round Rock, Tex., a corporation of Delaware Application January 23, 1932, Serial No. 588,262

5 Claims. (Cl. 251—127)

This invention relates generally to valves and specifically to that type including a valve seat sealed to the valve body by means accessible from the exterior of the body. Conventional valves of this type are defective in that leakage occurs at the valve seat and no means are provided to detect it.

This invention has for its general object the provision of a valve of this type, particularly adapted for use in pumps of the general type disclosed by Letters Patent of the United States to Stephens No. 1,832,259, of November 17, 1931, and embodying new and improved means to efficiently seal the valve seat to the body, and to advise the operator when the fluid pressure in the body becomes sufficiently great to cause bypassing of the fluid about the valve seat.

Other objects will hereinafter appear.

Figure 2:
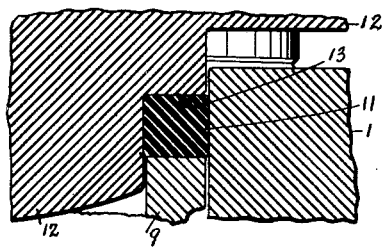
Figure 1:
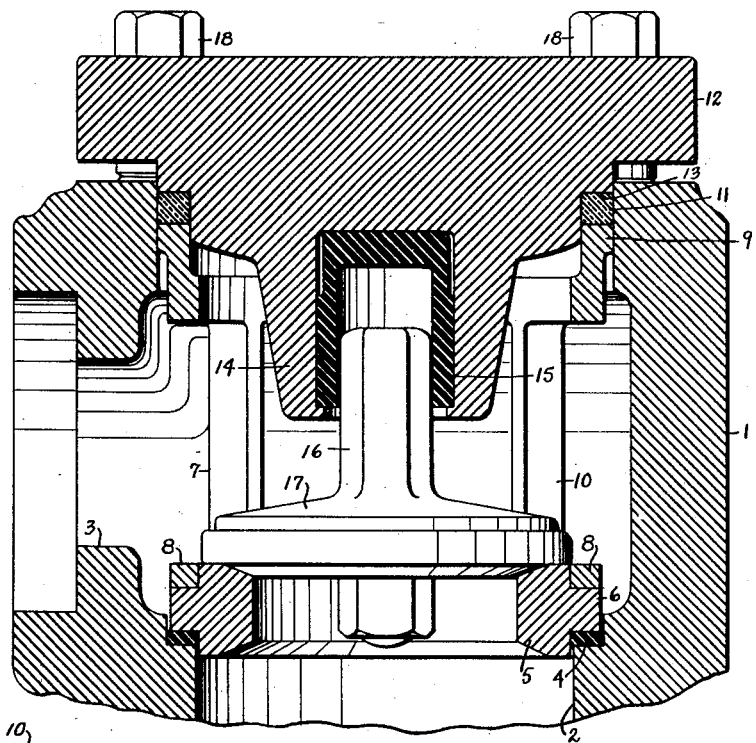
Figure 4:
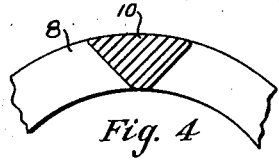
Figure 5:
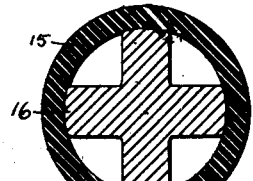
Figure 3:
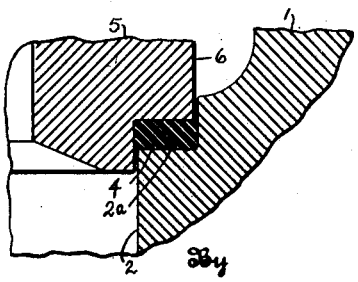

The preferred embodiment of the invention is illustrated by the accompanying drawing, of which Fig. 1 is a fragmentary sectional elevation of the assembled elements; Fig. 2, a detail view of the cover gasket and associated parts; Fig. 3, a detail view of the seat gasket and associated parts; Fig. 4, a detail view showing a cross section of a bar of the cage; and Fig. 5, a detail view showing the valve stem and cup therefor.

In the drawing, the valve body is indicated at 1. It has an inlet opening 2 and an outlet opening 3. Adjacent the inlet opening 2, the body has an annular shoulder 2a upon which rests a seat gasket 4. The valve seat 5 has an external annular flange 6 resting upon the seat gasket 4.

The valve cage is indicated generally at 7. Its lower ring 8 fits snugly on the seat 5 and bears against the external annular flange 6. Its upper ring 9 fits snugly in the body 1. The rings are connected by a plurality of circumferentially spaced bars 10.

Resting upon the upper ring 9 is a cover gasket 11; and bearing against the gasket 11 the cover 12 has an annular shoulder 13. The reduced depending extension 14 of the cover 12 is movable within the upper ring 9 of the cage; and this extension has a socket in which is fitted a rubber cup 15 for the reception of the fluted stem 16 of the valve 17. The cover is secured in place by suitable bolts 18.

When the bolts 18 are tightened, the cover 12 is forced downwardly, the cover gasket 11 is compressed and the cage 7 is made to move the seat 5 downwardly to compress the seat gasket 4.

It will be noted that this construction does not include a cage-engaging bolt in the cover. The use of such a bolt is objectionable because it must be packed and because, when excessively tightened, it bends and tilts the cage to permit leakage past the valve seat. In the present construction, the pressure is uniformly applied by the cover downwardly on the ring 9; and, as the valve cage 7 fits snugly in the body, the valve cage can not be tilted and the parts are, therefore, efficiently sealed.

Should the pressure of the fluid in the body 1 become excessive, so that leakage may occur about the seat 5, this will be disclosed by leakage at the cover 12. In other words, the cover gasket 11 will leak before the seat gasket 4. This will occur because:

The cover gasket 11 is forced radially into engagement with the body 1 when the cover 12 is moved downwardly. The side wall pressure of the cover gasket 11 on the body 1 is less than the vertical face pressure exerted by the cover. On the other hand, the seat gasket 4 is forced directly against the body 1 by the face pressure of the cover, and the pressure of the seat gasket 4 on the body is, therefore, greater than the pressure of the cover gasket 11 on the body. The width of the seat gasket 4 plus its vertical thickness is greater than the vertical thickness of the cover gasket 11. And so fluid encounters less resistance in passing upwardly between the cover gasket 11 and the body 1 than it encounters in passing downwardly between the seat gasket 4 and the body 1 and then laterally between the seat gasket 4 and the body 1. The compression of the seat gasket 4 is increased and the compression of the cover gasket 11 is decreased by fluid under pressure in the body 1 because the seat 5 is thereby forced downwardly on the seat gasket 4, and the cage 7 is permitted to move downwardly from the cover gasket 11.

In view of the foregoing, the operator may be reasonably certain that the seat gasket 4 is not leaking so long as the cover gasket 11 is not leaking.

The inside diameter of the cup 15 closely approximates the outside diameter of the valve stem 16 so that it acts as a guide for the valve stem. The bottom of the rubber cup limits the upward movement of the valve stem and acts as a shock absorber. When the valve is used to control the flow of liquids the rubber cup becomes wet so that there is very little friction between the cup and the stem.

Other advantages of this invention will be apparent to those skilled in the art. The invention is not limited to the preferred embodiment shown. Various changes may be made within the scope of the following claims.

We claim:

1. The combination of a valve body, said body having an inlet opening and an outlet opening; a valve seat adjacent said inlet opening; a seat gasket between said body and said seat; a valve cage movable in said body toward and away from said inlet opening and engaging said seat; a valve movable in said cage toward and away from said seat; a body cover adjustable with respect to said cage and said body; and a cover gasket between said cover and said cage; said cover being movable toward said inlet opening to compress said gaskets; said cover gasket being constructed with a smaller seating surface than said seat gasket whereby to offer less resistance to leakage than said seat gasket.

2. The combination of a valve body; a valve seat; a seat gasket between said body and said seat; a valve cage interiorly of said valve body engaging said seat; a valve for said seat; a body cover adjustable with respect to said cage and said body; and a cover gasket between said cage and said cover; said gaskets being compressible by said cover; said cover gasket being constructed with a shorter leakage path than said seat gasket so as to offer less resistance to leakage than said seat gasket.

3. The combination of a valve body, said body having an inlet opening and an outlet opening; a valve seat adjacent said inlet opening; a seat gasket between said body and said seat; a valve cage comprising a lower ring engaging said seat, an upper ring snugly fitting and slidable in said body, and spaced bars connecting said rings; a valve movable in said cage toward and away from said seat, and having a stem; a body cover having a socket for the guiding reception of said stem; and a cover gasket between the upper ring of said cage and said cover; said cover being movable toward said inlet opening to compress said gaskets; said cover gasket being constructed with a smaller sealing surface than said seat gasket whereby to offer less resistance to leakage than said seat gasket.

4. The combination of a valve body, said body having an inlet opening and an outlet opening; a valve seat adjacent said inlet opening; a seat gasket between said body and said seat; a valve cage movable in said body toward and away from said inlet opening and engaging said seat; a valve movable in said cage toward and away from said seat, and having a stem; a body cover having a socket for the guiding reception of said stem; and a cover gasket between said cover and said cage; said cover being movable toward said inlet opening to compress said gaskets; said cover gasket being constructed with a smaller sealing surface than said seat gasket whereby to offer less resistance to leakage than said seat gasket.

5. The combination of a valve body, said body having an inlet opening and an outlet opening; a valve seat adjacent said inlet opening; a seat gasket between said body and said seat; a valve cage movable in said body toward and away from said inlet opening and engaging said seat; a valve movable in said cage toward and away from said seat, and having a stem; a body cover having a socket for the guiding reception of said stem; and a cover gasket between said cover, said body and said cage; said cover being movable toward said inlet opening to compress said gaskets; said cover gasket being constructed so that its valve body engaging surface is less than the valve body engaging surfaces of the seat gasket so as to offer less resistance to leakage than said seat gasket.

JAMES S. ABERCROMBIE.
JOSEPH A. TENNANT.
HERBERT ALLEN.